(12) United States Patent
Venezia

(10) Patent No.: US 6,869,530 B1
(45) Date of Patent: Mar. 22, 2005

(54) MULTIFUNCTIONAL INTERNAL MARINE AQUARIUM FILTER

(76) Inventor: Alberto J. Venezia, 18642 Cape Sable Dr., Boca Raton, FL (US) 33498

( * ) Notice: Subject to any disclaimer, the term of this patent is extended or adjusted under 35 U.S.C. 154(b) by 0 days.

(21) Appl. No.: 10/935,422

(22) Filed: Sep. 7, 2004

(51) Int. Cl.[7] .............................. C02F 1/24; C02F 9/08; C02F 9/14; C02F 3/06; A01K 63/04
(52) U.S. Cl. .................... 210/221.2; 210/169; 210/249; 210/151; 210/202; 210/416.2; 119/263; 119/264
(58) Field of Search .............................. 210/221.2, 169, 210/249, 151, 202, 416.2; 119/263, 264

(56) References Cited

U.S. PATENT DOCUMENTS

| | | | | |
|---|---|---|---|---|
| 3,669,883 A | * | 6/1972 | Hucksdedt et al. | 210/703 |
| 5,078,867 A | * | 1/1992 | Danner | 210/169 |
| 5,282,962 A | * | 2/1994 | Chen | 210/169 |
| 5,385,665 A | * | 1/1995 | Neuhaus | 210/169 |
| 5,800,704 A | * | 9/1998 | Hansen | 210/169 |
| 6,808,625 B1 | * | 10/2004 | Wu | 210/221.2 |

* cited by examiner

Primary Examiner—Thomas M. Lithgow

(57) ABSTRACT

An internal marine aquarium filter that provides within a single enclosure protein skimming, biological, mechanical and chemical filtration where the unit creates direct adjustable current for the aquarium independent of the activities of filtration and uses one interchangeable pump which can be of different size and manufacture. The unit is comprised of an outer casing with dedicated areas for biological, mechanical and chemical filtration, a removable protein skimmer with collection cup and lid, a removable plumbing assembly connected to a submersible pump, which performs filtration, protein skimming and creates a direct adjustable water current inside the aquarium independent of all other functions, and has sponge filters that provide a place for biological activity. The function and configuration of the unit perform vertically as to minimize its size, wherein the resulting benefits thereof are of compactness, efficiency, reliability, quietness, multifunctionality, ease of use, economics, aesthetics and overall performance.

3 Claims, 3 Drawing Sheets

MULTIFUNCTIONAL INTERNAL MARINE AQUARIUM FILTER

CROSS-REFERENCE TO RELATED APPLICATIONS

Not applicable

STATEMENT REGARDING FEDERALLY SPONSORED RESEARCH OR DEVELOPMENT

Not applicable

REFERENCE TO SEQUENCE LISTING, A TABLE OR A COMPUTER PROGRAM LISTING COMPACT DISK APPENDIX

Not applicable

BACKGROUND OF THE INVENTION

The field of endeavor to which the invention pertains is the art and science of filtration and water movement for the marine aquarium.

For the hobbyist and researcher alike there are many devices and methods available to aid in keeping marine fish and invertebrates in the aquarium. Several criteria must be met for there to be a successful well-kept salt water aquarium. The water used must be natural sea water or purified water with the correct amount of proper salt mixed in. The aquarium must be kept within an adequate temperature range, it must have proper light and there must be adequate water movement, current, and filtration. The methods of filtration should include biological, chemical, mechanical and protein skimming. For salt water aquarium to sustain life there must be a place where biological activity can take place. This is where nitrifying bacteria convert ammonia and other waste products to nitrite and then to nitrate, a less harmful compound. This process is known as the nitrogen cycle. Periodic water changes will replenish nutrients, stabilize the water and prevent a buildup of nitrate in the aquarium system.

The invention relates to filtration and the creation of direct adjustable water flow and current in the salt water aquarium. The technology, methods and devices of the prior art have associated with them specific problems and inefficiencies to which my invention is drawn.

A search of the prior art did not disclose any patents that read directly on the claims of the invention; however, for background purposes and as indicative of the art to which the invention relates, reference may be made to the following patents found in the search:

| U.S. PAT. NO. | DATE ISSUED | INVENTOR | CLASS/SUBCLASS |
| --- | --- | --- | --- |
| 5,171,438 | Dec. 15, 1992 | Korez | 210/169 |
| 5,385,665 | Jan. 31, 1995 | Neuhaus | 210/169 |
| 5,518,611 | May 21, 1996 | Bresolin | 210/169 |
| 5,832,870 | Nov. 10, 1998 | Lin | 119/261 |
| 5,901663 | May 11, 1999 | Reinke | 119/259 |
| 6,303,028 | Oct. 16, 2001 | Marks et al. | 210/169 |
| 6,659,043 | Dec. 9, 2003 | Huska | 119/226 |
| 6,732,675 | May 11, 2004 | Liao | 119/259 |

The basic common devices of the prior art used for filtering and creating a direct adjustable water flow and current in the salt water aquarium consist of the canister filter, basic filter the wet-dry or sump system, the protein skimmer and the use of individual submersible or external pumps. Canister and basic filters operate in or out of the aquarium. They receive water from the aquarium, pass it through filter media and then by a means send the filtered water back to the aquarium. Wet-dry or sump filters receive water from the aquarium, filter it biologically, chemically, mechanically or by way of protein skimming and then by a means return the filtered water back to the aquarium. A protein skimmer is a unit requiring a means to mix water and air in a chamber and a means to allow the waste extracted to exit the aquarium system. It can function in or out of the aquarium or sit inside or outside of a wet-dry or sump filter. Individual submersible or external pumps are used to create direct adjustable water flow or currents inside the aquarium.

In the design and function of the canister or basic filter, there are problems and inefficiencies. The performance of these filters is limited to only basic biological, mechanical and chemical filtration. These filters only draw water in from below the surface level, leaving floating waste and debris to accumulate on the surface of the water of the aquarium. Whether they function in or out of the aquarium the waste accumulated in the filter could foul the water of the system before it is removed. The water passing through the filter and returning to the tank is not independent of the function of filtration; therefore, it is not a direct dedicated source of current for the aquarium. As waste and debris accumulate in the filter, the flow of water back to the aquarium could slow down and put additional stress on the pump and the aquatic system. Furthermore, for the simple nature of their function the units and their parts are complicated to manufacture.

The use of the wet-dry or sump system is a common method used to filter salt water aquariums. Upon examination, the problems and inefficiencies associated with this system become apparent. Wet-dry or sump systems require that the aquarium be drilled and a pre-filter installed or they require the use of an overflow box that relies on a siphon to remove the water from the aquarium if they are to function outside of the aquarium. These required conditions are complicated, expensive to create and add many points of failure to the system. If a wet-dry is to function inside of the aquarium utilizing a trickle method of filtration, evaporation becomes a problem due to the limited space and the requirement to maintain different levels of water accurate in the system. Due to the fact that wet-dry or sump systems perform their functions with their modes of filtration operating adjacent to one another, within an outer casing, the overall size of the unit becomes a disadvantage and these units end up positioned below the aquarium or become obtrusive inside the aquarium.

A wet-dry or sump system requires three pumps to perform filtration, provide protein skimming and create a direct, independent, dedicated current inside the aquarium. External wet-dry or sump systems that use a trickle method of filtration add additional surface area to the aquarium system which results in excessive evaporation. When a wet-dry or sump system utilizes a protein skimmer, the water drawn into the skimmer has already been passed through some previous method of filtration. This event drastically reduces the efficiency of the skimming effect. In addition, a wet-dry or sump system creates excessive, unwanted noise and (based upon the extent of its functions and structural requirements relative to its size and the amount of water that it must hold) it can be complicated and expensive to manufacture.

The protein skimmer of the prior art is a unit with a means to create a mixture of air and water. This form of filtration is known as foam fractionation. Some of the problems and inefficiencies associated with the protein skimmer are that it performs only one function requires its own pump and (because of the nature of its function) is complicated to manufacture. In addition, if it functions outside of the aquarium it becomes a point of failure for leakage. If it functions within the aquarium it only draws water in from below the surface, leaving organic wastes to accumulate on the surface of the aquarium water. While in the aquarium, the protein skimmer takes away from the aesthetic nature of the marine environment. Some models function inside or outside of the wet-dry or sump system. The problem here is that the water that is drawn into the skimmer has already been filtered through the wet-dry or sump. This event drastically reduces the efficiency of the skimming effect. The most efficient protein skimmer will draw in raw unfiltered water from the surface and below the surface of the aquarium, giving it the chance to remove organic waste and push it out of the system before it gets trapped in other filter media to remain in the system. Furthermore, a stand-alone unit outside of the wet-dry or sump requires additional plumbing for installation and is a point of failure for possible leakage.

In the prior art, the individual submersible pump installed in the aquarium or a pump cooperating with a filter system are used to create current in the aquarium. These methods have with them associated problems and inefficiencies in their function. The individual submersible pump in the aquarium adds excess heat to the system, requires more power, adds extra expense, and also results in an additional point of failure. The pump is mounted inside the aquarium, is difficult to hide aesthetically, and may pose a threat to small fish and invertebrates that go near its intake.

In the prior art, when it comes to creating water current in an aquarium, a pump that cooperates with a filter system is inefficient in its function in several ways. The pumps first function is to pass water through filtration and this main event determines the size and water flow characteristics of the pump. This leaves the current creating requirement of the function dependent upon what pump is needed to make the filter work properly. A simple example of this problem is to try to get a pump that needs to flow water through filtration at 40 gallons per hour to create a current in an aquarium equivalent to 400 gallons per hour. Certain marine invertebrates require high currents irrelevant of the requirements of the rate of flow through filtration. The creation of direct water flow and current is most efficient when it is independent of the activity of filtration. Another illustration of this is during feedings. When the aquarium system has water flow and current that exceed the rate of filtration, more nutrition can be taken up by the animals and less of it ends up in the filter as a waste product. This leads to more efficient feedings, reduced cost and less bio-load added to the system.

BRIEF SUMMARY OF THE INVENTION

The Multifunctional Internal Aquarium Filter, in one compact unit, provides direct independent water flow and current for the aquarium as well as protein skimming, and biological, mechanical, and chemical filtration all within its outer casing. The protein skimmer is fully adjustable and draws in raw unfiltered water from below the surface of the aquarium through openings in its sides near the bottom, as well as water at the surface through an opening at the top in the front of the unit. All of the functions of the unit are driven by one submersible pump which is interchangeable, and can be of various size and manufacture. Rising above the outer casing of the unit, the protein skimmer with its collection cup and lid is easily removable for cleaning.

The plumbing assembly with pump is positioned below the protein skimmer. A removable pump is connected to the bottom of the plumbing assembly surrounded by the outer casing with biological filter sponges above and below it. The whole plumbing assembly is easily removed for cleaning and maintenance. This combination of conditions and functions among others makes the unit whisper quiet, easy to maintain, multifunctional and unobtrusive in the aquarium. The design, function and arrangement of the elements of the unit overcome all of the known limitations, problems and inefficiencies of the basic or canister filter, the wet-dry or sump system, individual submersible pump and the protein skimmer of the prior art.

With the use of this unit the aquarium water never leaves the aquarium. The unit does not require the aquarium to be drilled with pre-filters installed or use overflow boxes, siphons or drainage. Additional plumbing is not required. This eliminates many points of failure and the need for additional equipment, lowers expense and makes installation and maintenance quick and easy while providing all of the necessary filtration, protein skimming and water current requirements of the modern marine aquarium.

DETAILED DESCRIPTION OF THE INVENTION

Figure 1:
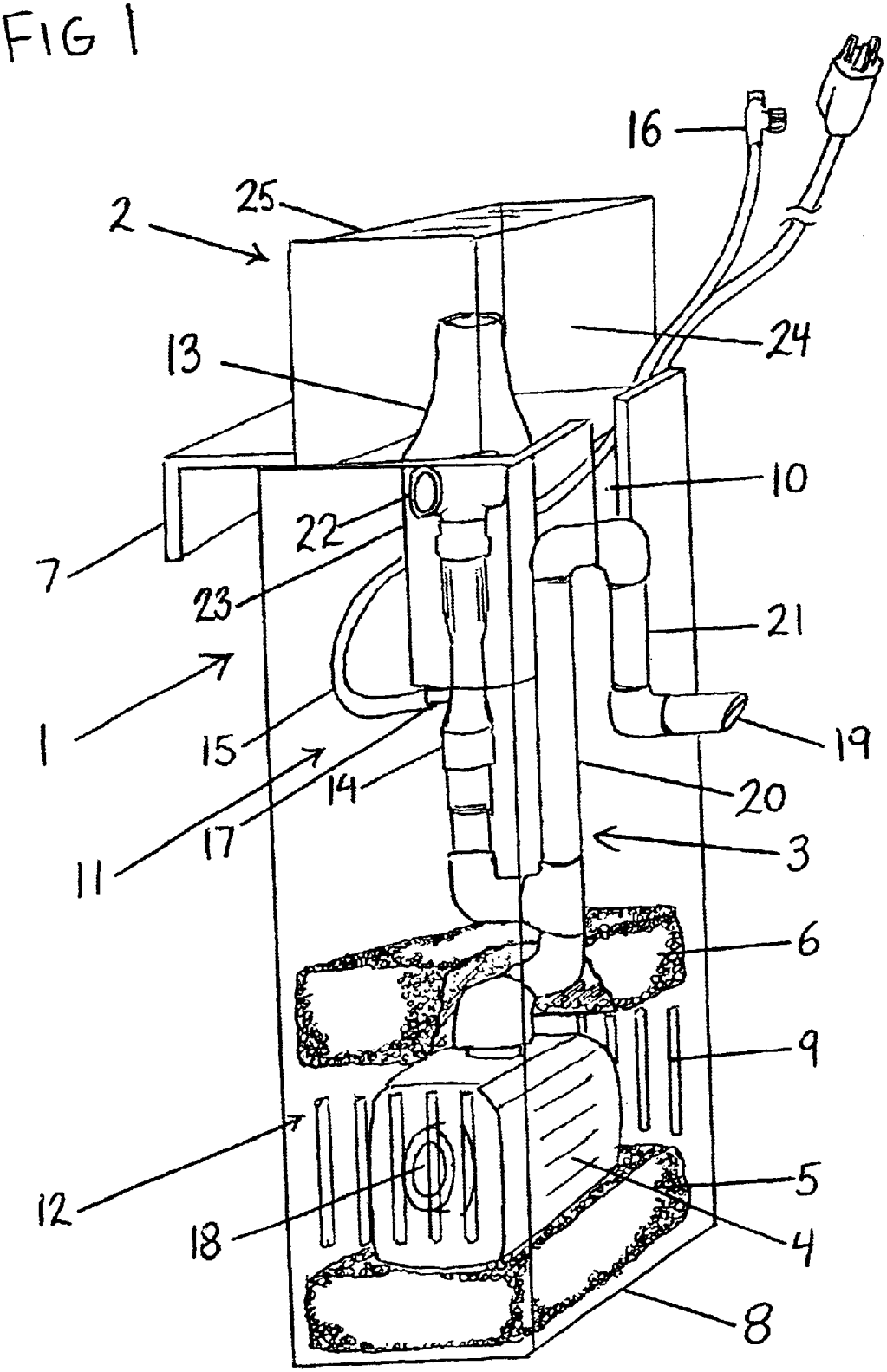
FIG. 1 is a general perspective view of the Multifunctional Internal Marine Aquarium Filter.
Figure 2:
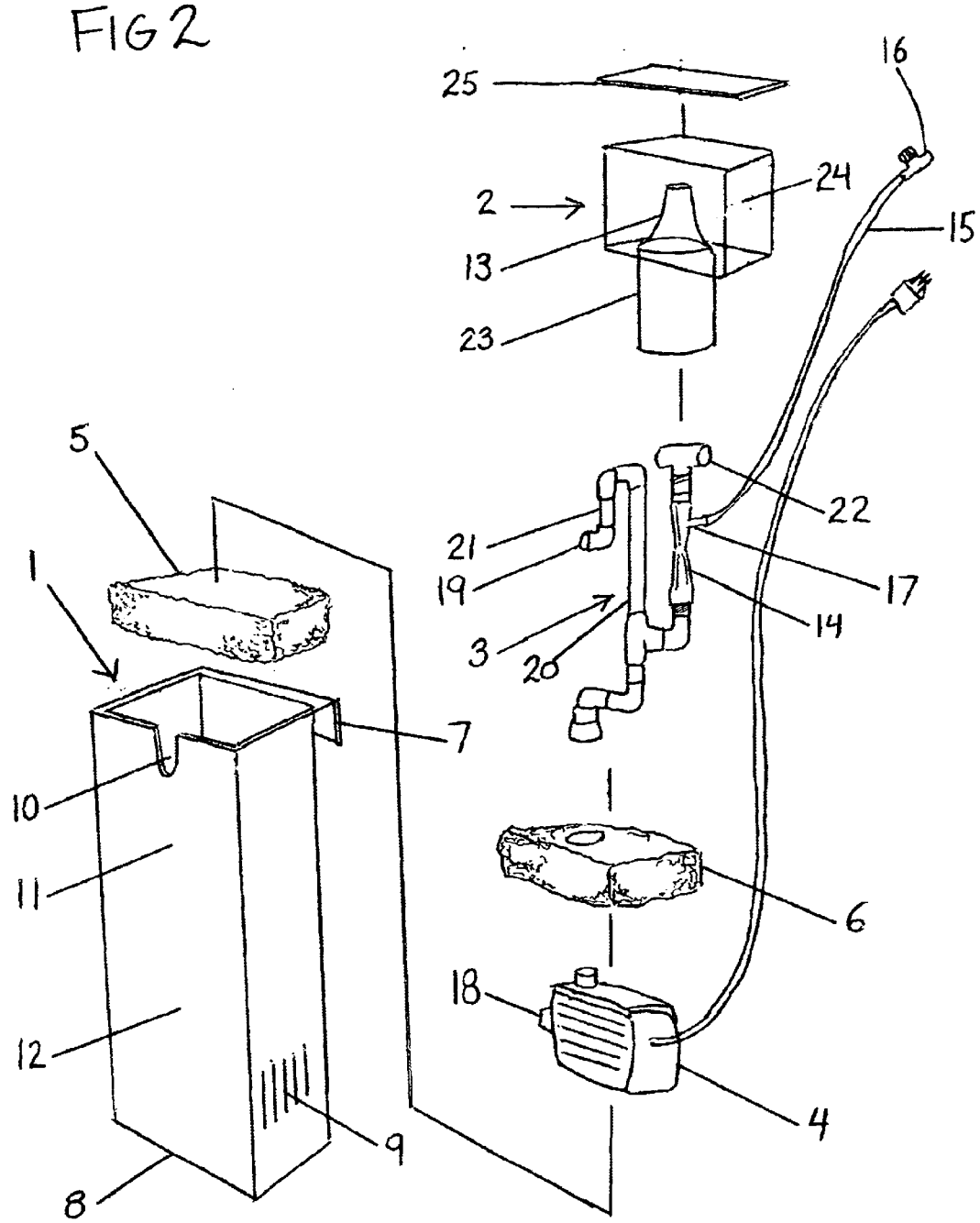
FIG. 2 is a schematic view of the Multifunctional Internal Marine Aquarium Filter.
Figure 3:
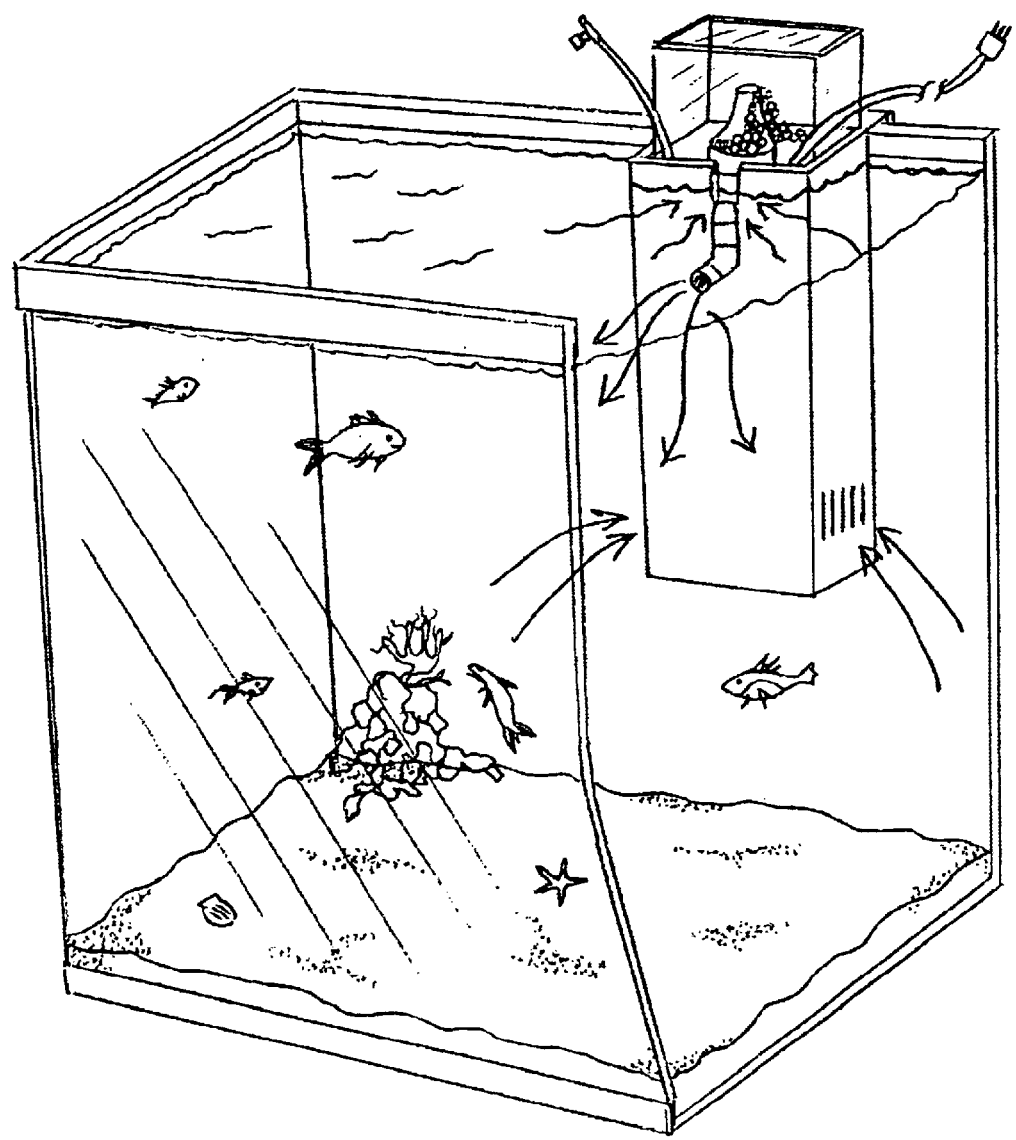
FIG. 3 is an illustrative drawing of the Multifunctional Internal Marine Aquarium Filter.

The invention is comprised of five components: The outer casing (1), the protein skimmer (2), the plumbing assembly (3) with removable pump (4), the lower sponge (5) and upper sponge (6) which perform the functions of biological and mechanical filtration. The outer casing is made of ⅜ inch thick black acrylic plastic. It is formed with four sides, a bottom and is open from the top. The outer casing has a rear hanger (7) which enables it to hang on the inside of any of the four walls of an aquarium. It has a flat bottom (8) allowing it to be positioned upright anywhere inside on the bottom of an aquarium. The outer casing has a plurality of openings towards the bottom of both sides (9). This plurality of openings allows water below the surface of the aquarium to enter the outer casing. On the front panel of the outer casing there is an opening at the top center (10) which allows water at the surface to enter and is where the plumbing assembly is suspended inside the outer casing. Two internal areas of the outer casing are indicated as an upper area above the first sponge (11) and a lower area below the first sponge (12).

The protein skimmer is fabricated from clear acrylic plastic. It is comprised of 3/16 inch acrylic sheet and acrylic tube. The upper riser (13) is formed by heating and flaring one end to form a funnel. The parts are then glued together with acrylic cement to form a water tight bond.

The plumbing assembly with removable pump is comprised of PVC parts ½ inch in diameter, an injector (14), a piece of hose (15), a small plastic air valve (16) and a removable submersible pump. The injector is a device which creates a vacuum of air that is pulled through the injector barb (17) as pressurized water passes through it. The hose is attached to the barb and the small plastic air valve is attached to the other end. The valve controls how much air is allowed into the injector, resulting in full control of the amount of waste removed from the protein skimmer. The pump is of a submersible type. The only requirements for the pump is that it fits in the lower space of the outer casing, can be connected to the plumbing assembly and its flow rate meets the flow requirement of the desired application.

The two sponges providing a place for biological activity are firm and porous filter sponges of the same type. The upper sponge is positioned between the protein skimmer and the pump. The lower sponge is positioned at the bottom of the outer casing.

Upon placement of the unit in a full aquarium, water will enter the outer casing through the plurality of openings in the outer casing. The water will rise inside the outer casing until the height of the water level in the outer casing is equal to the height of the water outside the outer casing in the aquarium. At this point, the plumbing assembly and pump, the two sponges and the lower chamber of the protein skimmer will be submerged within the outer casing.

Once the pump is activated, water will be drawn into the intake of the pump (18) and sent through the plumbing assembly. The water will be drawn in from the plurality of openings at the top in the front and near the bottom on the sides of the outer casing. As the pump pushes water through the plumbing assembly, the water travels out the main shaft return (19) out to the aquarium to create water movement and current and out through the injector into the lower chamber of the protein skimmer to perform protein skimming. Since the internal opening inside the injector is smaller in diameter than the inside of the rest of the plumbing assembly, back pressure is created that sends a larger volume of water back to the aquarium to create water flow and current independent of the action of the protein skimmer. This diversion of water from one pump to perform the separate and distinct functions of foam fractionation or protein skimming, the creation of independent direct water flow and current inside the aquarium, other modes of filtration and separate, different, flows of water and current of varying and adjustable pressures, speeds and volumes for the aquarium has not been achieved in the prior art.

The exiting water of the main shaft (20) is adjustable by rotating the main shaft return or turning the down shaft (21) right to left. This gives the user the ability to adjust or change the direction of the direct water flow and current inside the aquarium.

The water that is pumped through the injector pulls a vacuum of air through the injector barb and hose. The volume of air entering is controlled by the plastic air valve. When this jet of water and air mix, it travels out the top of the injector and hits the top of the injector tee (22) and then exits both sides of the tee and hits the inside wall of the lower chamber of the protein skimmer (23). This effect creates fine air bubbles violently mixed with salt water and the result is foam fractionation.

Organic waste is attracted to the surface area of the fine air bubbles contained within the lower chamber of the protein skimmer. As constant water is jetted out the injector tee, the aquarium water loses its organic waste to the surface area of all the bubbles. The bubbles become dark with waste and get pushed up the lower chamber of the protein skimmer and then up the upper riser and finally over into the collection chamber (24). The amount of skimmer overflow is controlled by the air valve and it will collect into the collection chamber under a removable lid (25) until removed. If the overflow of skimmer waste fills the overflow chamber to capacity, additional waste overflow will spill back into the lower chamber of the protein skimmer without spilling outside the aquarium system. As water exiting the injector loses its organic waste, the cleaner water remaining flows out of the bottom of the lower chamber of the protein skimmer where it enters a space interior of the outer casing and exterior to the lower chamber where it can be further filtered biologically, mechanically or chemically by the use of certain filter media installed in this inner space.

Previously in the art, the arrangement, method and function of protein skimming, creating direct adjustable water movement or current in the aquarium independent of the protein skimmer, biological, mechanical and chemical filtration have been accomplished by using separate devices. Protein skimmers have been used inside the aquarium but do not create a direct adjustable water current independent of the water that flows out of the skimmer back into the aquarium. Water that flows out of a skimmer (the spill-out) is saturated with fine air bubbles. In addition, if the skimmer spill out were to be directed into the aquarium to effect a water current it would fill the aquarium with very fine air bubbles. If the bubbles were diverted or buffered, it would minimize the direct current. Therefore, the purpose of skimmer spill-out is not to create direct adjustable water flow or current for the aquarium but simply to allow the skimmer to function.

Other filter systems will send water back to the aquarium to create current after it passes through filtration. Given this limitation they cannot create water flow or current independent of the requirements of filtration.

This invention diverts the water from a single pump to create separate and different flows of water and current, of varying adjustable pressures, speeds and volumes, into the aquarium to perform the distinct function of providing direct adjustable water flow and current to the aquarium, and through an injector into the protein skimmer to perform the function of protein skimming, and then into an inner space where it is further filtered biologically, mechanically and chemically. The functions are separate and independent of one another and yet are accomplished by the use of one pump. The water sent back to the aquarium is independent of the water sent through the injector and into the lower chamber of the protein skimmer, where it is sent through filtration.

While the preceding descriptions are directed to a preferred embodiment of the invention, and the invention has been described in complete detail and illustrated in the drawings, it is not to be limited to such embodiment and details since many changes and modifications may be effected without departing from the spirit and scope thereof. The invention is described to cover any and all modifications, forms and arrangements which may come within the language and scope of the appended claims.

I claim:

1. An internal filtration unit for marine aquarium comprising an outer casing, plumbing assembly with removable pump and injector, protein skimmer, and filter sponges, wherein:

said outer casing comprising a front, back, two sides and bottom adjoining to form an enclosure that is open from the top, closed on the bottom, taller than it is wide and wider than it is thick, where there is a means at the top towards the back to enable said outer casing to hang on an interior wall of an aquarium and where the bottom of the outer casing is flat to enable it to stand upright to function on the inside bottom of an aquarium where along the sides of said outer casing towards the bottom there are a plurality of openings, and on the front panel at the top there is at least a one opening forming an open channel;

said plumbing assembly with removable pump and injector comprising a submersible pump connected by a removable means to the base of a conduit connected to a manifold where an injector is mounted by a removable means creating a conduit rising up vertically, forming the whole conduit, where on the interior of the injector there is a change of diameter from the inside diameter of the manifold that creates back flow pressure on one side and a jet of water and space around the jet of water on the other side where located on the outside of the injector where the jet of water and space is formed is a barb to which a hose is connected, to which a plastic air valve is connected which controls the amount of air entering the injector, where located at the top of the injector and connected by way of a removable means is a tee fitting that directs the flow of water and air from the injector out the sides of the tee, where at the manifold another conduit is connected to the manifold rising up vertically and parallel to the injector conduit and continuing to the top height of the injector conduit and then turning outward and downward, where at the manifold is a sealed means that may be unsealed to connect other conduits to exit water from the manifold, where the complete assembly with the pump attached fits inside the outer casing in a vertical arrangement, where the pump is towards the bottom, the injector conduit is towards the back interior wall of the outer casing, the other conduit is towards the front interior wall of the outer casing, where the downward turn of the other conduit hooks over and suspends the whole assembly and pump from the bottom of the opening near the top of the front panel of the outer casing, where the outward and downward turns of the other conduit are installed on the exterior of the outer casing;

said protein skimmer comprising a hollow cylindrical body connected to the base of a larger rectangular enclosure that forms four sides and a base where in the base is a circular opening that forms a channel down through the bottom of the hollow cylindrical body, where in the rectangular enclosure is a hollow cylindrical riser smaller in diameter at the top and flared to the diameter of the hollow cylindrical body at the bottom, where it is connected inside on the base of the rectangular enclosure surrounding the opening forming a separate chamber within the rectangular enclosure and outside the flared riser, where the flared riser is lower than the four sides of the rectangular enclosure, where the inside diameter of the bottom of the flared opening of the riser is the same diameter of the opening in the base, forming an open and smooth channel through the top opening of the flared riser through the base of the rectangular enclosure, through the bottom of the hollow cylindrical body, where the lower portion of the rectangular enclosure will exactly fit in the top opening of the outer casing, where the hollow cylindrical body hangs downward, and completely surrounds the injector conduit and tee of the plumbing assembly and comes to rest at a level determined by an adjustable means, creating an inner space between the outer wall of the hollow cylindrical body and the interior walls of the outer casing, where filter media of different type may be contained, further leaving a clearance between the rectangular enclosure and the outer casing, where the hose of the injector barb and the electrical cord of the pump can exit the outer casing, where there is a top cover that fits snugly on the rectangular enclosure leaving a unique space between the shape of its bottom and the top of the riser inside the rectangular enclosure, where the complete protein skimmer assembly is removable from the outer casing and when installed rises above the outer casing in a position where the portion of the assembly inside the outer casing makes no direct connection to any plumbing element, where said portion is above the other filtration elements of the outer casing arranged in a vertical fashion;

said sponges, comprising shape that enable a snug fit from all sides of the interior walls of the outer casing, where one sponge is positioned between the pump and the manifold of the plumbing assembly below the hollow cylindrical body of the protein skimmer and above the plurality of openings in the sides of the outer casing and another sponge is positioned in the interior bottom of the outer casing below the plurality of the openings.

2. The internal filtration unit of claim 1 wherein the protein skimmer pump receives and skims polluted water from the aquarium that has not been previously passed thru filtration, and that has been drawn from the surface and below the surface of the water of the aquarium.

3. The internal filtration unit of claim 1 wherein the plumbing assembly and pump using only one pump, creates diversion and separate and different flows of water and current of varying and adjustable pressures, speeds and volumes that are used to perform separate independent functions for the aquarium.

* * * * *